US008262938B2

(12) United States Patent
Matzdorf et al.

(10) Patent No.: US 8,262,938 B2
(45) Date of Patent: Sep. 11, 2012

(54) ACTIVE ALUMINUM RICH COATINGS

(75) Inventors: Craig Matzdorf, California, MD (US); William Nickerson, Fairfax, VA (US)

(73) Assignee: The United States of America, as represented by the Secretary of the Navy., Washington, DC (US)

( * ) Notice: Subject to any disclaimer, the term of this patent is extended or adjusted under 35 U.S.C. 154(b) by 0 days.

(21) Appl. No.: 13/010,830

(22) Filed: Jan. 21, 2011

(65) Prior Publication Data

US 2012/0187343 A1    Jul. 26, 2012

(51) Int. Cl.
C09K 3/00        (2006.01)
C23F 11/00       (2006.01)
C11D 3/12        (2006.01)
A01N 43/64       (2006.01)
A61K 31/41       (2006.01)

(52) U.S. Cl. ............... 252/387; 252/389.52; 510/334; 514/359; 514/375; 514/394; 514/396; 514/717; 524/382; 524/406; 524/407

(58) Field of Classification Search ............ 252/387, 252/389, 389.52; 524/94, 382, 406, 407, 524/417, 439, 440, 80; 424/613, 615, 657, 424/722; 510/199, 334, 378, 421; 514/359, 514/375, 394, 396, 415, 717
See application file for complete search history.

(56) References Cited

U.S. PATENT DOCUMENTS

| | | | |
|---|---|---|---|
| 3,186,836 A | | 6/1965 | Pryor et al. |
| 3,240,688 A | | 3/1966 | Pryor et al. |
| 3,281,239 A | | 10/1966 | Reding et al. |
| 3,379,636 A | | 4/1968 | Reding et al. |
| 3,393,138 A | | 7/1968 | Hine |
| 3,595,608 A | | 7/1971 | Pryor |
| 4,098,606 A | | 7/1978 | Despic et al. |
| 4,141,725 A | * | 2/1979 | Murai et al. ............. 420/541 |
| 4,459,335 A | * | 7/1984 | Tanaka et al. ............ 428/323 |
| 4,631,172 A | | 12/1986 | Yamamoto et al. |
| 4,950,560 A | | 8/1990 | Tarcy |
| 5,336,303 A | | 8/1994 | Cocks |
| 2007/0096060 A1 | * | 5/2007 | Arafat et al. ............. 252/387 |
| 2010/0197836 A1 | * | 8/2010 | Price et al. ................. 524/94 |

OTHER PUBLICATIONS

Lennox, T. J., Groover, R. E., Peterson, M. H., "Electrochemical Characteristics of Six Aluminum Galvanic Anode Alloys in the Sea", Materials Protection and Performance, vol. 10, Issue 9, Sep. 1971, pp. 39-44, National Association of Corrosion Engineers, 1440 South Creek Drive, Houston, TX, USA 77084-4906.
Reding, J. T., Newport, J. J., "The Influence of Alloying Elements on Aluminum Anodes in Sea Water", Materials Protection, vol. 5, Issue 12, Dec. 1966, pp. 15-19, National Association of Corrosion Engineers, 1440 South Creek Drive, Houston, TX, USA 77084-4906.
Smith, S. N., Reding, J. T., Riley, R. L., Jr., "Development of a Broad Application Saline Water Aluminum Anode—"Galvalum" III", Materials Performance, vol. 17, Issue 1, Mar. 1978, pp. 32-36, National Association of Corrosion Engineers, 1440 South Creek Drive, Houston, TX, USA 77084-4906.
Lemieux, Edward, Hartt, William H., Lucas, Keith E., "A Critical Review of Aluminum Anode Activation, Dissolution Mechanisms, and Performance", Corrosion 2001, Mar. 11-16, 2001, National Association of Corrosion Engineers, 1440 South Creek Drive, Houston, TX, USA 77084-4906.
Lennox, T. J., Peterson, M. H., Groover, R. E., "A Study of Electrochemical Efficiencies of Aluminum Galvanic Anodes in Sea Water", Materials Protection, vol. 7, Issue 2, Feb. 1968, pp. 33-37, National Association of Corrosion Engineers, 1440 South Creek Drive, Houston, TX, USA 77084-4906.
Edwards, Junius David, Wray, Robert I., "Aluminum Paint and Powder", 1955, p. 12, Reinhold Publishing Corporation, 430 Park Avenue, New York, NY, USA 10022.
Payne, Henry Fleming, "Pigments and Pigmented Coating", Organic Coating Technology vol. II, pp. 931 and 1278, 1961, John Wiley & Sons, Inc., 111 River Street, Hoboken, NJ USA 07030-5774.

* cited by examiner

*Primary Examiner* — Bijan Ahvazi
(74) *Attorney, Agent, or Firm* — Mark O. Glut

(57) ABSTRACT

Chromate-free corrosion-inhibiting coating compositions comprising film-forming binders and galvanic aluminum alloy powders prepared in an oxygen (oxidizing), nitrogen (inert) or nitrogen-hydrogen (reducing) atmosphere having particle sizes ranging up to 100 microns. The aluminum alloy powders having the formula: aluminum-zinc-X (AlZnX) wherein X is an element selected from the group consisting of indium, gallium, tin and bismuth. Improvement in corrosion protection is obtained by the addition of chemical inhibitors such as an azole or talcite clay to the coating which further inhibits the self-corrosion of the aluminum alloy and extends the corrosion protection of the metal substrate being protected.

24 Claims, 17 Drawing Sheets

US 8,262,938 B2

ACTIVE ALUMINUM RICH COATINGS

STATEMENT OF GOVERNMENT INTEREST

The invention described herein may be manufactured and used by or for the Government of the United States of America for governmental purposes without the payment of any royalties thereon or therefor.

FIELD OF THE INVENTION

Various surfaces and particularly metal surfaces require the protection of coatings especially when the surfaces are exposed to corrosive environments. Metal surfaces of aircraft, for example, are exposed to seawater which require protection from corrosion. Specifically, aircraft, e.g., Navy aircraft, are exposed to seawater spray in addition to various acid-forming gases such as sulfur dioxide, carbon dioxide, etc. Moreover, in addition to aircraft, various machinery and equipment in the industrial environments, where fossil fuels are used, need protection against corrosion. It is important therefore that the coating be resistant to corrosion, various chemicals, the weather and at the same time be flexible and have good adhesion to the metal surface. The coating may be applied by various methods including spraying, rolling, or brushing onto the surface depending on the viscosity. The viscosity of the coating for the particular application may be achieved by adjusting the content of the solvent within the ranges specified and by the selection of the particular reactants used to form the polymeric binder.

BACKGROUND OF THE INVENTION

Many metallic pigments are known which provide electrochemical, electrical, thermal, barrier and other properties to compositions which are used for protecting material such as metal from corrosion, maintaining electrical conductivity, shielding equipment from electromagnetic fields, resisting elevated temperatures, and providing protection from moisture. Silver, gold and other noble metal pigments are used for their electrical conductivity and thermal conductivity properties. Zinc and magnesium are used for their electrochemical properties. Aluminum is used for its thermal and chemical barrier properties. A major shortcoming of the noble metals is their strong cathodic potential. When used in products for electrical and thermal management, the noble metals can couple with anodic materials like aluminum alloys used for electrical equipment.

A shortcoming of zinc pigments is low electrical conductivity and low thermal conductivity compared to the noble metals and relatively poor resistance to chlorides and other corrosive materials. A shortcoming of magnesium pigments is high relative anodic potential compared to other metals. In addition, magnesium forms a protective oxide spontaneously in air, rendering it less effective than zinc for the sacrificial protection of steel and other cathodic materials.

Galvanically active metallic powders or "pigments" have been added to coatings or paints for at least 60 years. These pigments are intended to impart galvanic or electrochemical protection to the coated metal, by polarizing the metal to an operating potential which does not allow for corrosion to occur. Coatings containing zinc or magnesium-based pigments are the most common. Zinc is typically used to protect steel. U.S. Pat. No. 3,615,730 discloses zinc-rich primers based on inorganic silica which binds and supports the zinc powder and keeps it intact to the substrate. Zinc-rich primers based on organic epoxy and polyurethane resins are commercially available and specified by DoD in MIL-DTL-24441 Formula 159, MIL-P-21035, and A-A-5975. A major drawback is that zinc-based galvanic primers or protective coatings do not perform well in highly corrosive acidic chloride environments leading to premature corrosion and hydrogen cracking of high-strength steel alloys. Another problem is that zinc is cathodic to aluminum and its alloys in many environmental conditions and therefore will not provide galvanic protection. The relative operating potential of zinc versus aluminum alloys is shown in FIG. 1.

Another class of metal-filled coatings is based on magnesium powder. The US Navy investigated the merit of magnesium-rich epoxy primers and documented the results of performance of these coatings on aluminum alloys in NADC-MA-7063, "Investigation of Metallic Pigments as Corrosion Preventives in Aircraft Primers," A. Stander, Oct. 5, 1970. These coatings were not adopted by the Navy as they did not perform as well as the chromated epoxy primers qualified to MIL-P-23377, and used on aircraft at the time, especially in $SO_2$ salt fog testing as defined by ASTM G85.

Magnesium-rich primers developed by North Dakota State University and documented in US Patent applications US2007/0128351 A1 and US2009/0155598 A1, which are commercially available from Akzo Nobel exhibit similar performance limitations. Regardless of what is done to these coatings, the operating potential of magnesium remains very high (negative) compared to aluminum, leading to higher self-corrosion rates and lower efficiencies. These coatings also exhibit unusual failure mechanisms which are not well understood.

U.S. Pat. No. 5,336,303 discloses electrochemically active paints based on magnesium, magnesium alloys and calcium alloys which have a high (negative) operating potential to protect steel substrates. These coatings provide protection, but also suffer from high self-corrosion rates, low efficiencies and poor performance in highly acidic chloride environments like those seen by Navy aircraft, ships, and facilities.

Coatings with aluminum powders have been used for over 100 years. These coatings are excellent barriers to the environment and provide good thermal stability and protection. Many bridges, tanks and other steel structures have been painted with aluminum-pigmented coatings over the years with much success. These coatings do not, however, provide galvanic or electrochemical protection of the metal surface on which they are coated, since the aluminum powder or flakes are covered with aluminum oxide which inhibits electrochemical action. These uses and shortcomings are well documented in "Aluminum Paint and Powder by J. D. Edwards and R. I. Wray, $3^{rd}$ Edition, 1955.

However, magnesium, zinc and aluminum anodes are currently used in bulk form to protect metal from corrosion. To be effective, the anodes need to be in contact electrically with the object they are protecting when immersed in water or an electrolyte. There is extensive literature which describes the pros and cons of each anode material. Aluminum anodes are preferred, since they are inexpensive and provide the highest efficiency of the three metals.

Table 1 shows the electrical out put and cost effectiveness of these three metals based on weight. With regard to recent spot prices for each metal and their relative cost effectiveness clearly aluminum is superior to zinc and magnesium and therefore preferred based on cost, weight and longevity.

Table 1: Comparison of Electrical Properties of Magnesium, Zinc and Aluminum (from Reding, J. T. Newport, J. J.: The Influence of Alloying Elements on Aluminum Anodes in Sea Water. Materials Protection, Vol. 5. December 1966, pages 15-19).

TABLE 1

Properties and Costs of Magnesium, Aluminum, and Zinc

| | Mg | Al | Zn |
|---|---|---|---|
| Theoretical | | | |
| Potential (volts) Electrical | 2.61 | 1.90 | 1.00 |
| Output (amp hrs/lb) | 1000 | 1352 | 372 |
| Metal cost (cents/lb) | 35 | 24.5 | 14.5 |
| Cost of current at 100% efficiency (cents/amp-hr) | .035 | .018 | .039 |

Before the 1970's aluminum anodes were not used for the same reasons stated herein for aluminum powders and flakes. The bulk material rapidly passivated, rendering the anode inactive and incapable of protecting the intended metal object. The development of activated aluminum alloys began in the mid-1960's. The intellectual property is documented in U.S. Pat. Nos. 3,379,636; 3,281,239; 3,393,138 by Dow Chemical and U.S. Pat. No. 3,240,688 by Olin Mathesin. All of these alloys were unique in that for the first time bulk aluminum alloys were shown to remain active and galvanically protect metal. Unfortunately, none were commercially successful as they all suffered from low efficiencies making them less economical than zinc anodes. During the 1970's, Dow developed an aluminum anode alloy, which does not passivate and has very high efficiencies, approaching 90% of theoretical.

In addition to being highly efficient versus theoretical, this alloy was designed to have an operating potential of −1.05 volts versus Ag/AgCl reference electrode. This is about the same as zinc and optimum for protecting aluminum and steel structures. Aluminum alloys used on aircraft, amphibious and ground vehicles, and other common DoD and commercial applications have operating potentials that range from about −0.800 to −0.0700 volts and alloy steels have operating potentials around −0.650 volts. The operating potential gap between the aluminum anode and the materials it's designed to protect is therefore about 200-300 millivolts for aluminum and 350 millivolts for steel.

This gap is enough to provide protection, but not so large that the anode rapidly self corrodes, like magnesium. This anode alloy has been investigated for use as a bulk coating of concrete with imbedded steel rebar and applied by flame spray processes.

SUMMARY OF THE INVENTION

This invention is directed to galvanic pigmented coatings based on an aluminum alloy powder without the typical passive oxide film, and with an additional chemical inhibitor. The coating is designed to provide electrochemical protection to aluminum, steel and other metallic objects on which it is applied, withstand the severe operating environment of Navy aircraft, ships and facilities (as well as any other outdoor environment), at low cost, and easy to mix and apply. The Al—Zn-metal alloy e.g. Al—Zn—In was procured in bulk from Galvotec Inc., a qualified supplier for MIL-A-24799. Ames National Laboratory processed this bulk aluminum alloy to spherical powders using their gas atomization process. The bulk aluminum-zinc-metal alloy was processed in an oxygen (oxidizing) or nitrogen-hydrogen ($N_2/H_2$) (reducing) atmosphere to obtain spherical aluminum alloy powders.

The aluminum powders received from Ames were sieved in three powder size ranges: <20 microns, 20 to 45 microns, and 45 to 100 microns. Examples were prepared with the <20 micron powders, since the thickness of the initial coatings of interest for naval aircraft are approximately 25 microns or one-thousandth of an inch thick. The aluminum alloy powders were added to different coatings or primers: a two component epoxy-amide, similar to high-performance products qualified to MIL-PRF-23377 and single-component moisture-cured polyurethane, similar to MIL-DTL-53039. It should be noted that smaller particle sizes, including those in the sub-micron range, may be used in alternative embodiments, however, the cost of production of such particles may make their use impractical.

DETAIL DESCRIPTION OF THE INVENTION

Figure 1:
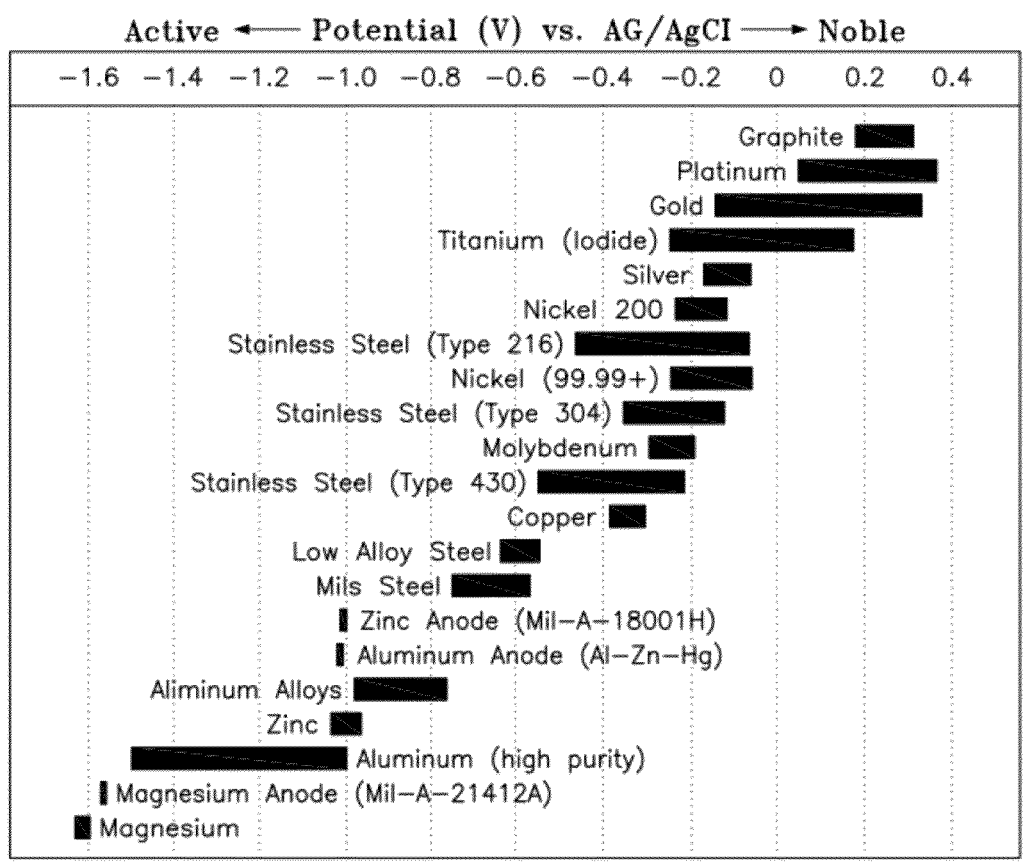
FIG. 1: Operating Potential of Zinc Compared to Aluminum and other materials.
Figure 2A:
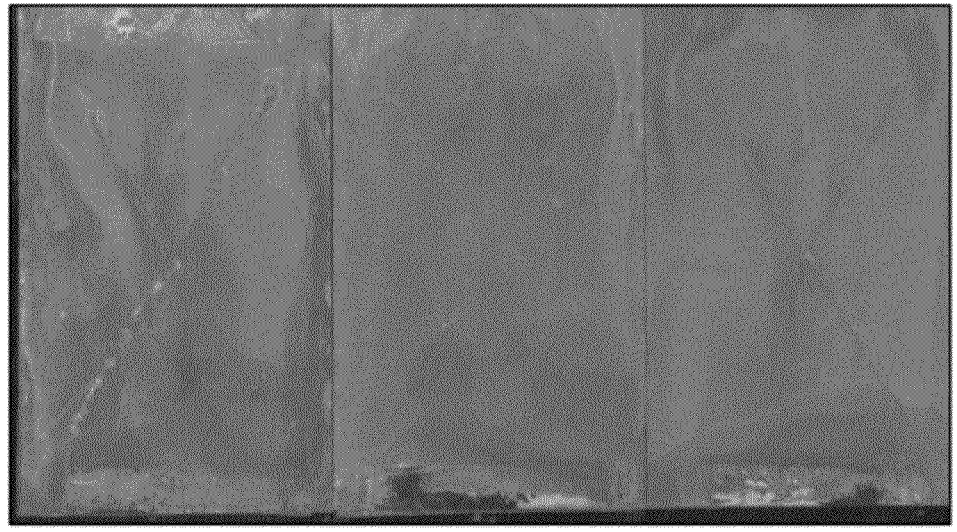
FIG. 2a: DP-1 on 2024 aluminum with SurTec 650 a commercial TCP conversion coating after 2000 hours in ASTM B117 neutral salt fog.
Figure 2B:
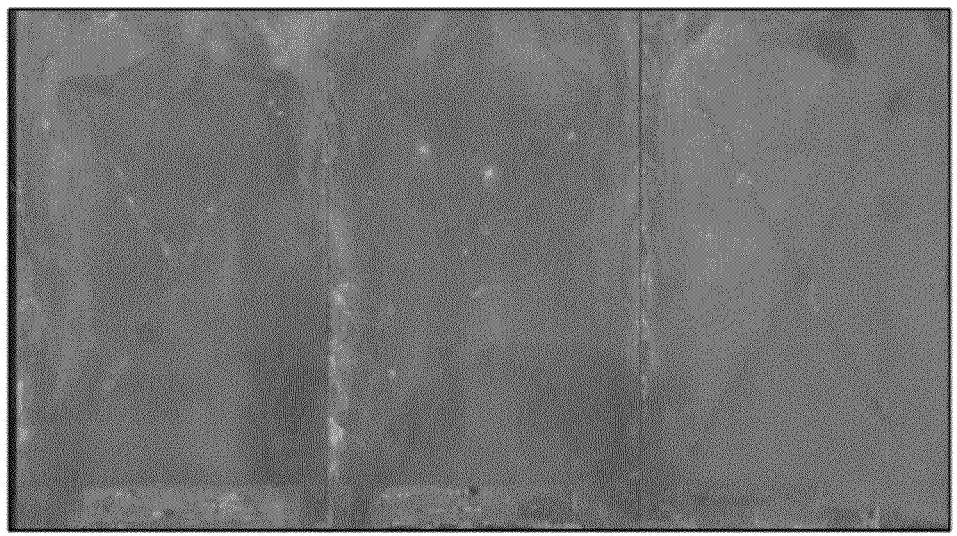
FIG. 2b: DP-1 on 7075 aluminum with Surtec 650 a TCP conversion coating after 2000 hours in ASTM B 117 neutral salt fog.
Figure 2C:
FIG. 2c: DP-2 on 2024 aluminum with SurTec 650 conversion coating after 2000 hours in ASTM B 117 neutral salt fog.
Figure 2D:
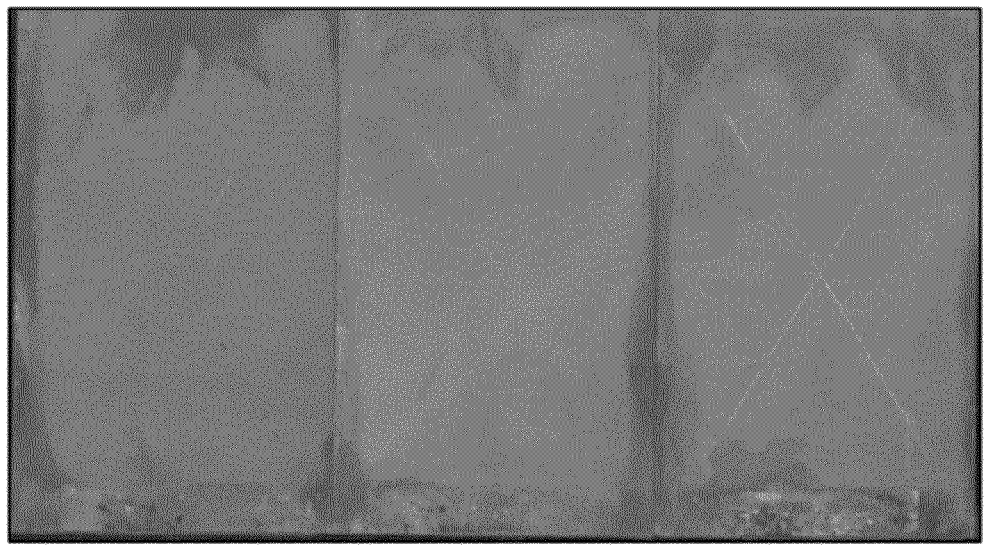
FIG. 2d: DP-2 on 7075 aluminum with Surtec 650 conversion coating after 2000 hours in ASTM B 117 neutral salt fog.
Figure 2E:
FIG. 2e: MIL-PRF-23377 Class N primer on 2024 aluminum with Surtec 650 conversion coating after 2000 hours in ASTM B117 neutral salt fog.
Figure 2F:
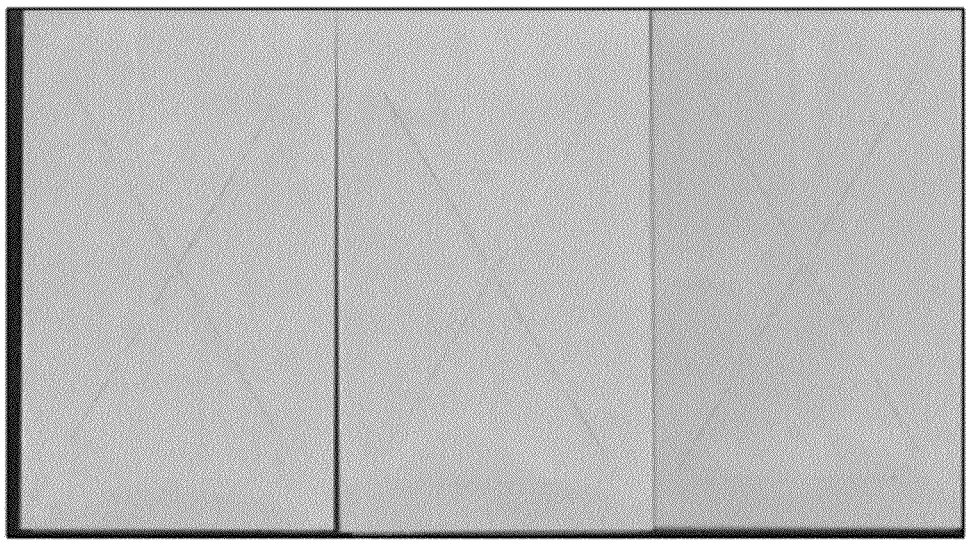
FIG. 2f: MIL-PRF-23377 Class N primer on 7075 aluminum with Surtec 650 conversion coating after 2000 hours in ASTM B117 neutral salt fog.
Figure 2G:
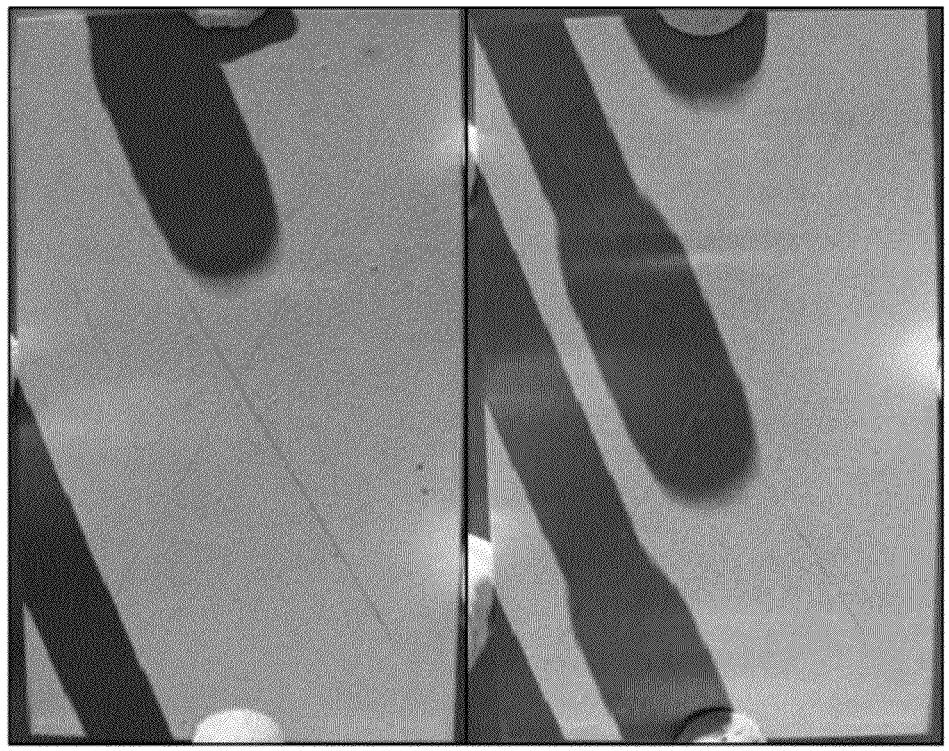
FIG. 2g: DP-1 on 2024 (left) and 7075 (right) aluminum with Surtec 650 conversion coating after 4 months at Kennedy Space Center beachfront exposure site.
Figure 2H:
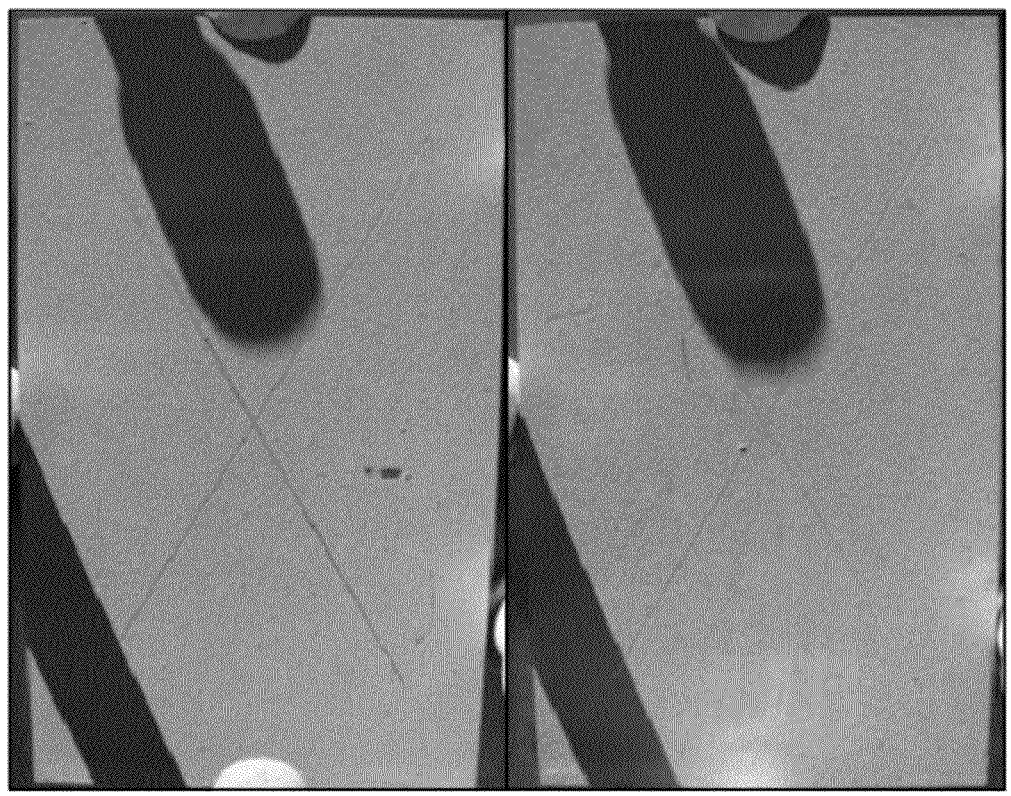
FIG. 2h: DP-2 on 2024 (left) and 7075 (right) aluminum with Surtec 650 conversion coating after 4 months at Kennedy Space Center beachfront exposure site.
Figure 2I:
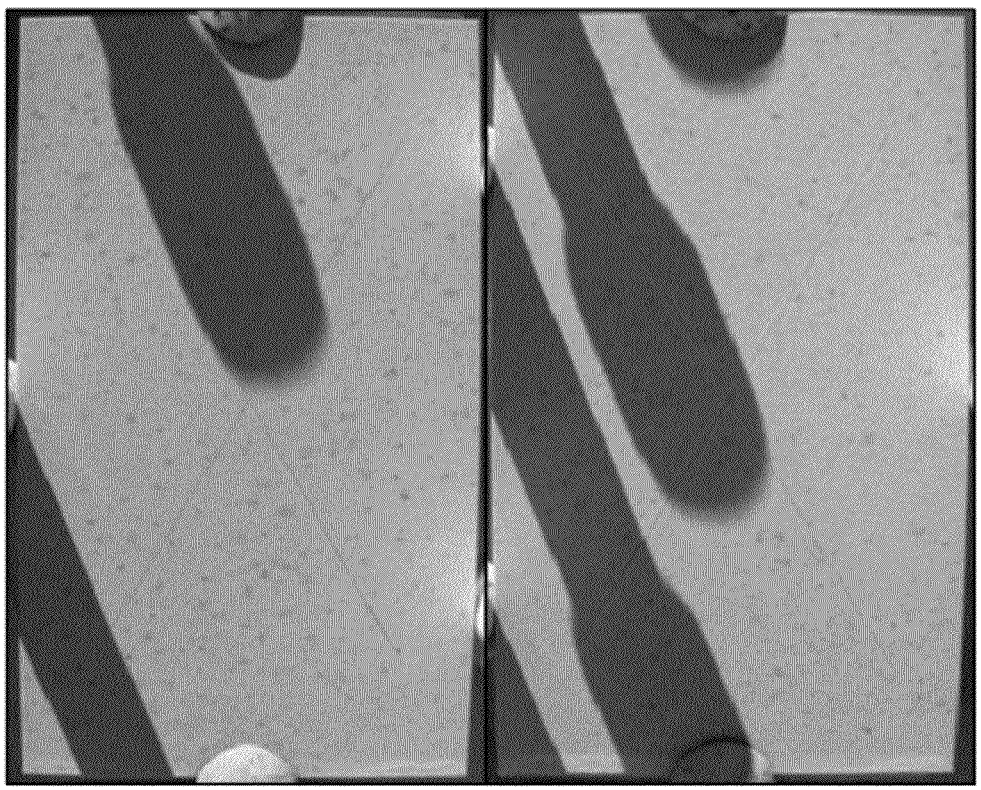
FIG. 2i: MIL-PRF-23377 Class N primer on 2024 (left) and 7075 (right) aluminum with Surtec 650 conversion coating after 4 months at Kennedy Space Center beachfront exposure site.
Figure 3A:
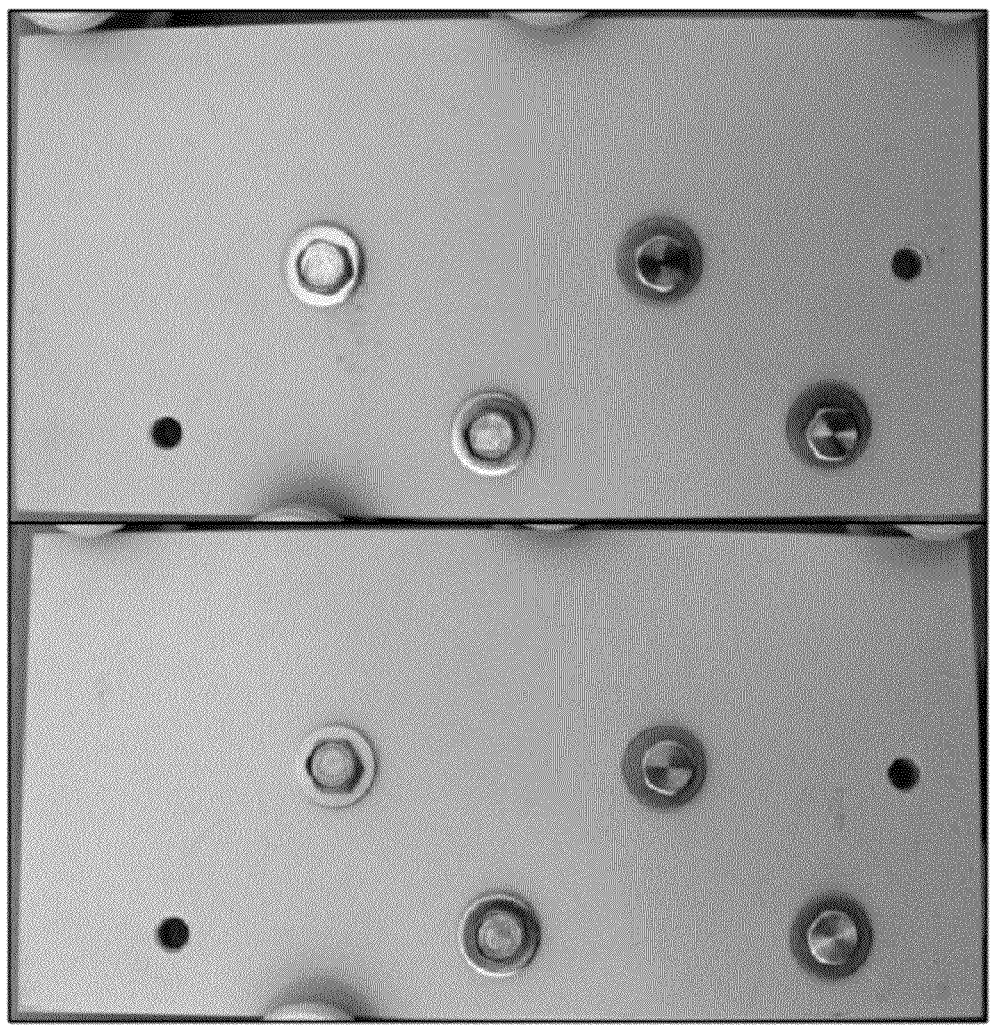
FIG. 3a: MIL-PRF-23377 Class N primer on 2024 (top) and 7075 (bottom) aluminum with Surtec 650 conversion coating as installed at Kennedy Space Center beachfront exposure site.
Figure 3B:
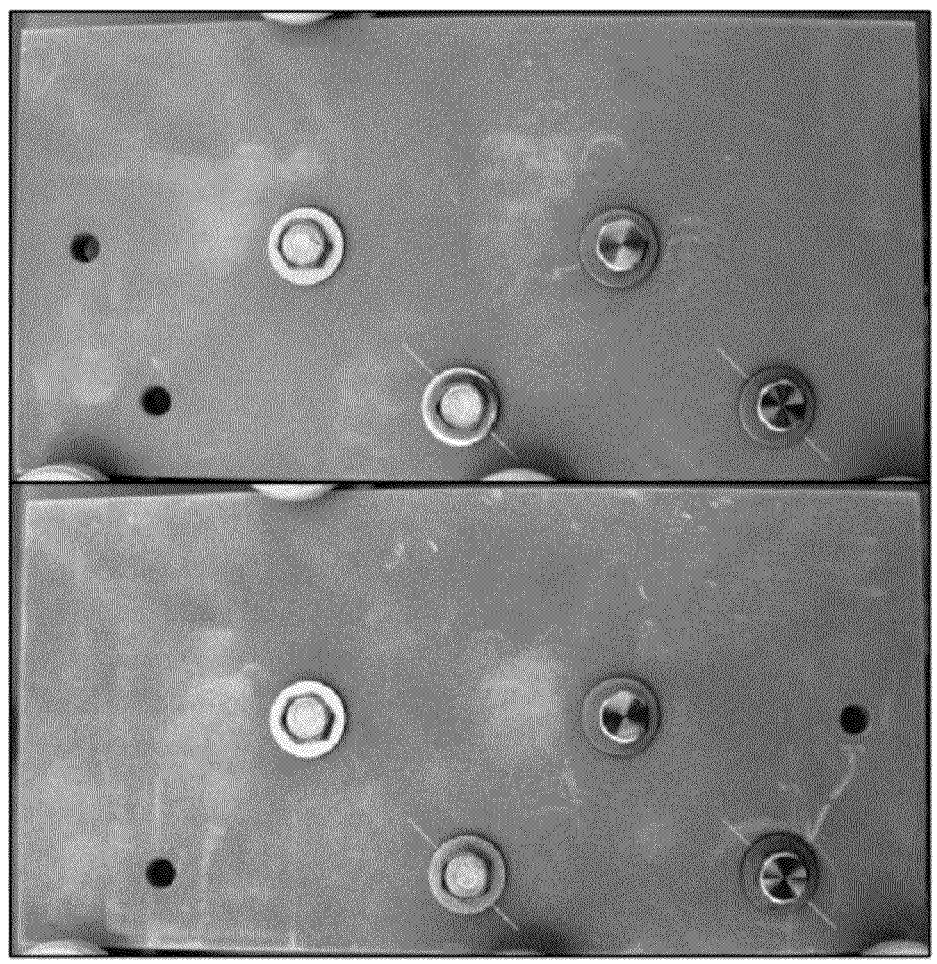
FIG. 3b: DP-1 on 7075 aluminum (top) and DP-2 on 2024 aluminum (bottom) with Surtec 650 conversion coating as installed at Kennedy Space Center beachfront exposure site.
Figure 3C:
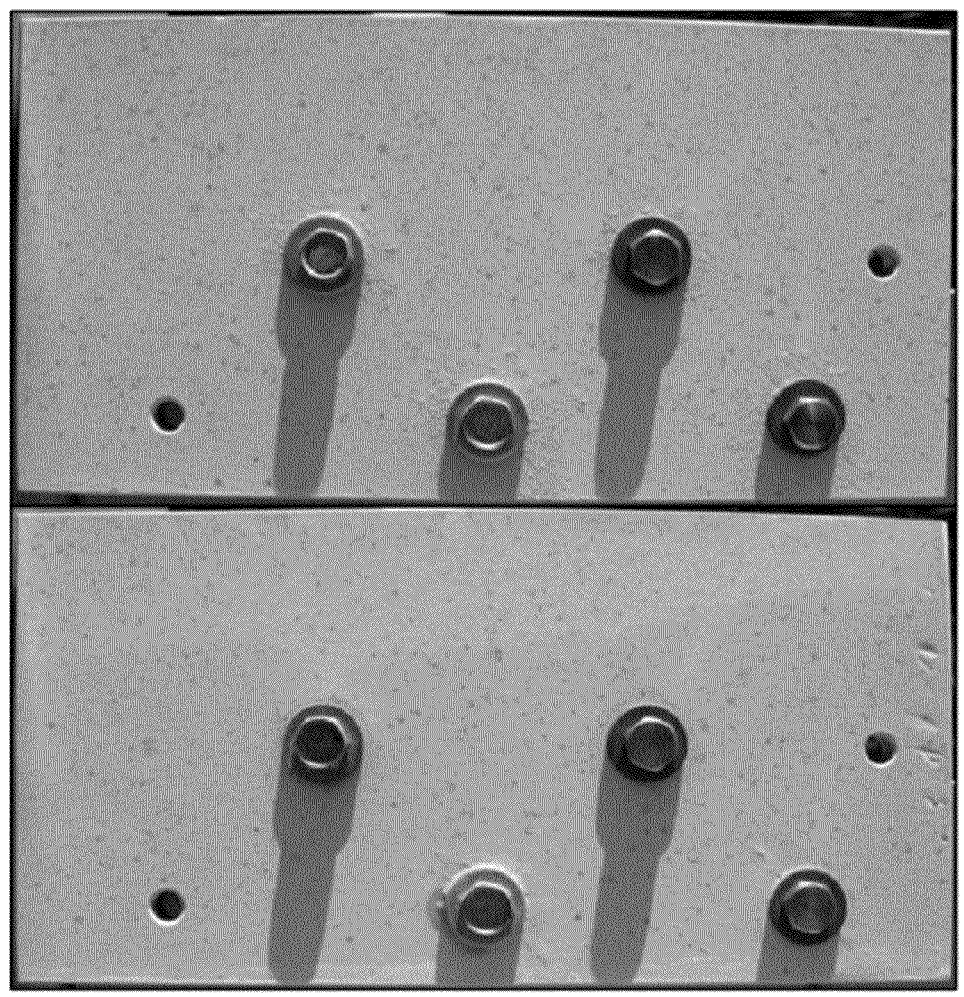
FIG. 3c: MIL-PRF-23377 Class N primer on 2024 (top) and 7075 (bottom) aluminum with Surtec 650 conversion coating after 4 months at Kennedy Space Center beachfront exposure site.
Figure 3D:
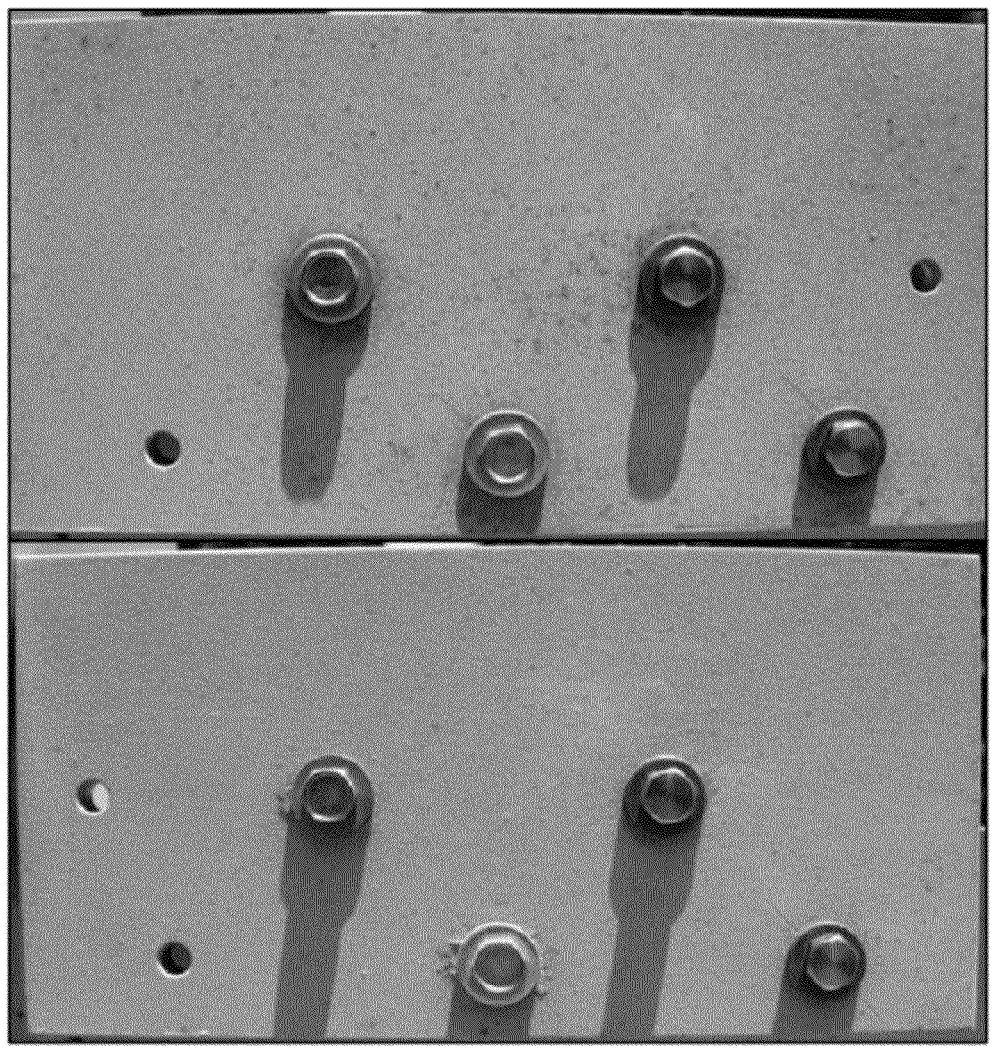
FIG. 3d: DP-1 on 2024 (top) and 7075 (bottom) with Surtec 650 conversion coating after 4 months at Kennedy Space Center beachfront exposure site.
Figure 3E:
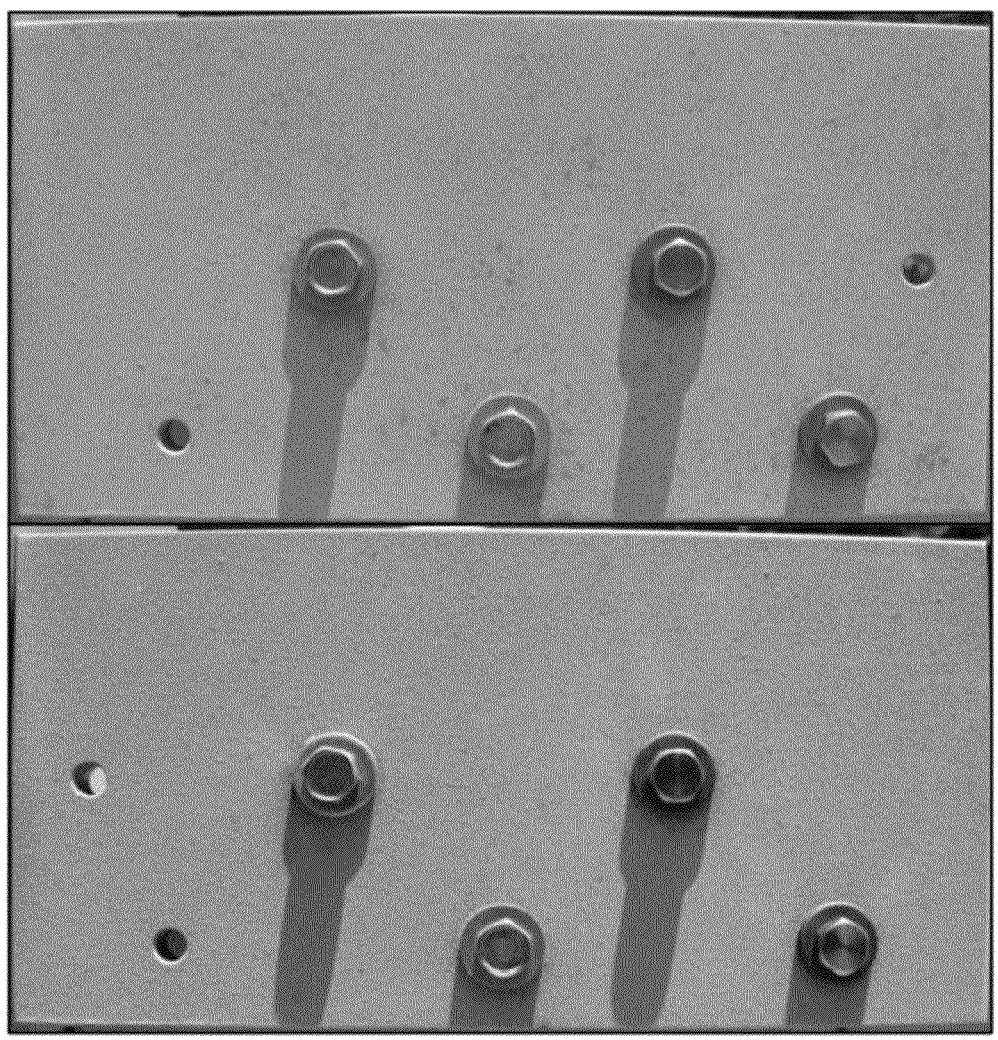
FIG. 3e: DP-2 on 2024 (top) and 7075 (bottom) aluminum with Surtec 650 conversion coating after 4 months at Kennedy Space Center beachfront exposure site.

This invention relates to chromate-free corrosion-inhibiting coatings for metal substrates including, for example, aluminum, aluminum alloys, iron and various other ferrous metals such as steel.

The chromate-free corrosion-inhibiting coatings for application onto metal substrates consists essentially of, in parts by weight, from about 15 to 50 and preferably 20 to 40 parts of a film-forming binder, 40 to 85 and preferably 50 to 70 parts of a galvanic aluminum alloy powder prepared in an oxygen or nitrogen-hydrogen atmosphere having a particle size ranging from about 2 to 100 microns, e.g. 2-12, 12-20, 20-45 or 45-100 microns; said aluminum alloy powder having a composition formula of Aluminum-Zinc-X wherein X is an element selected from the group consisting of indium, gallium, tin and bismuth, from about 0.0 to 2.0 and preferably 0.1 to 1.5 parts of at least one wetting agent, from about 1.0 to 10 and preferably from 2.0 to 6.0 parts of at least one ionic corrosion inhibitor selected from the group consisting of Hybricor 204 an inorganic hydro-talcite clay, benzimidazole, benzothiazole, benzoxazole, diphenyltriazole, benzotriazole and tolylazole, and effective amounts of solvent, e.g., water or an organic solvent ranging up to about 50%, e.g., from about 10-25% by weight of the coating.

The binder for the coating is selected from the group consisting of polyacrylates, polyurethanes, polyimides, polymers derived from epoxies, polymers derived from isocyanates, and the uncured pre-polymers of said polymers. The film-forming binder also can be selected from the group consisting of polymers derived from silanes, siloxanes, silicones, silicates, zirconates and titanates.

In theory, a metal that is less noble than another in which it is in contact, e.g. aluminum on steel, can function as a corrosion inhibitor when added to a coating as pigment particles or powder. However, aluminum particles, whether in a coating or not, have a naturally forming oxide film on their surface which is electrically insulating and prevents the aluminum from protecting these materials from corrosion. Therefore, it was found necessary to add very small amounts of alloying elements to aluminum and aluminum alloys which inhibit the formation of aluminum oxide on the surface of the particles. Aluminum particles of this nature remain electrically active and are able to retard corrosion of metals which are more cathodic (electropositive) than the particles. For purposes of this invention, the aluminum alloy Al—Zn—In was made into particles. The addition of indium (alternatively, gallium, tin or bismuth) effectively inhibits the formation of oxide as particles made from pure Al or Al—Zn form the natural oxide which renders the particle inert for galvanic corrosion protection. Further improvement in corrosion protection of a substrate material is possible by the addition of another chemical corrosion inhibitor such as triazole or talcite clay, which helps inhibit the self-corrosion of the active aluminum alloy particle and extends the corrosion protection of the surface being protected. The Al—Zn—In particles inhibit corrosion on their own, but are even more effective when combined with a corrosion inhibitor. For the purpose of this invention, this inhibitor includes talcite clay, benzimidazole, benzothiazole, benzoxazole, diphenyltriazole.

The following Examples illustrate the aluminum-rich alloy (Al—Zn—X) coating compositions of this invention.

EXAMPLE 1

(DP-1 and DP-2) 127.6 grams of a <20 micron "$O_2$" processed aluminum-zinc-indium powder was added to 50.0 grams of moisture curing polyurethane binder and 1.0 grams of wetting agent (diethyleneglycol alkylether) (Composition DP-1). A second batch of this same composition was prepared. To it, 5.0% by weight of hydrotalcite clay corrosion-inhibiting pigment (Hybricor 204) was added and thoroughly mixed (Composition DP-2). Primers were allowed to stand for 30 minutes and applied, using a standard air paint gun, to 2024-T3 and 7075-T6 aluminum alloy panels which had been conversion coated with a non-chromated coating conforming to MIL-DTL-81706 Type II.

EXAMPLE 2

Panels with coatings made from DP-1 and DP-2 as prepared in Example 1. Coatings were applied to aluminum 2024 and 7075 panels which had been mechanically abraded or treated with MIL-DTL-81706 TYPE II "TCP" a commercial conversion coating. Panels were scribed through the primer and into the aluminum alloy with a carbide tipped stylus in an X pattern, with each line of the X approximately 4 inches long. One set was exposed to ASTM BI 17 neutral salt fog, one set to ASTM G85 Annex 4 $SO_2$ salt fog, and one set placed on beach front exposure racks at Kennedy Space Center.

FIGS. 2a to 2i show how DP-1 and DP-2 performed compared to a high-performance non-chromated primer qualified to MIL-PRF-23377 Class N in ASTM B117 neutral salt fog at 2000 hours and at the Kennedy Space Center beachfront test site after 4 months. The DP-1 and DP-2 are equal to or better than the MIL-PRF-23377 Class N controls. DP-2 shows less corrosion that DP-1 on 2024 and both are clearly better than the control. After four months at KSC, the DP-1 and DP-2 show no corrosion, similar to the MIL-PRF-23377 Class N controls.

EXAMPLE 2a

Galvanic test panels using coatings prepared in Example 1 were prepared and placed on beach front exposure racks along with panels and coatings described in Example 2. FIGS. 3a to 3e show the coatings after four months. Table 2 shows undercutting ratings at various intervals compared to control coatings made using MIL-PRF-2337 Class N (non-chromated) primer. The DP-1 and DP-2 coatings outperform all coatings, including chromated primers qualified to MIL-PRF-23377 Class C and MIL-PRF-85582 Class C.

TABLE 2

ASTM D 1654 Table 2 Rack 14

| Panel # | Location | Jul. 8, 2009 New | Jul. 22, 2009 2 weeks | Aug. 5, 2009 4 weeks | Aug. 19, 2009 6 weeks | Sep. 2, 2009 8 weeks | Sep. 16, 2009 10 weeks | Sep. 30, 2009 12 weeks | Oct. 30, 2009 4 month |
|---|---|---|---|---|---|---|---|---|---|
| 2024 DP-1 | 1AB | 10 | 10 | 10 | 10 | 10 | 10 | 10 | 10 |
| 2024 DP-2 | 1CD | 10 | 10 | 10 | 10 | 10 | 10 | 10 | 10 |
| 7075 DP-1 | 1EF | 10 | 10 | 10 | 10 | 10 | 10 | 10 | 7 |
| 7075 DP-2 | 1GH | 10 | 10 | 10 | 10 | 10 | 10 | 10 | 10 |
| 2024 MIL-PRF-23377 Class N | 2AB | 10 | 9 | 9 | 7 | 4 | 4 | 4 | 4 |
| 7075 MIL-PRF-23377 Class N | 2EF | 10 | 10 | 9 | 9 | 9 | 9 | 9 | 7 |

EXAMPLE 3

(DP-6) 19.6 grams of <20 micron $N_2/H_2$ processed aluminum alloy powder was added to 15 milliliters of an epoxy base component A, thoroughly mixed by hand stirring and then mixed with 5 milliliters of curing catalyst B. (organo metallic zinc octoate). After mixing, 10 milliliters of butyl acetate thinner was added and mixed. This primer was allowed to induct 30 minutes and then spray applied to 2024-T3 and 7075-T6 test panels, with and without a MIL-DTL-81706 Type II TCP conversion coating. Other curing catalysts include dibutyl tin dilaurate, stannous actuate, zinc octoate, zinc naphthenate, vanadium alkyl acetonate, zirconium octoate and other known organo metallic compounds.

EXAMPLE 4

(DP-9) 85.0 grams of <20 micron $N_2/H_2$ processed powder was added to 30 milliliters of an epoxy polymer component A, thoroughly mixed by hand stirring and then mixed with 10 milliliters of catalyst B. After mixing, 10 milliliters of butyl acetate thinner was added and mixed. This primer was allowed to induct 30 minutes and then was spray applied to 2024-T3 (left) and 7075-T6 (right) test panels, with and without a MIL-DTL-81706 Type II TCP conversion coating.

EXAMPLE 5

Figure 4:
FIG. 4: DP-6 on 2024 (left) and 7075 (right) aluminum with Surtec 650 conversion coating after 840 hours of exposure to ASTM G85 $SO_2$ salt fog.
Figure 5:
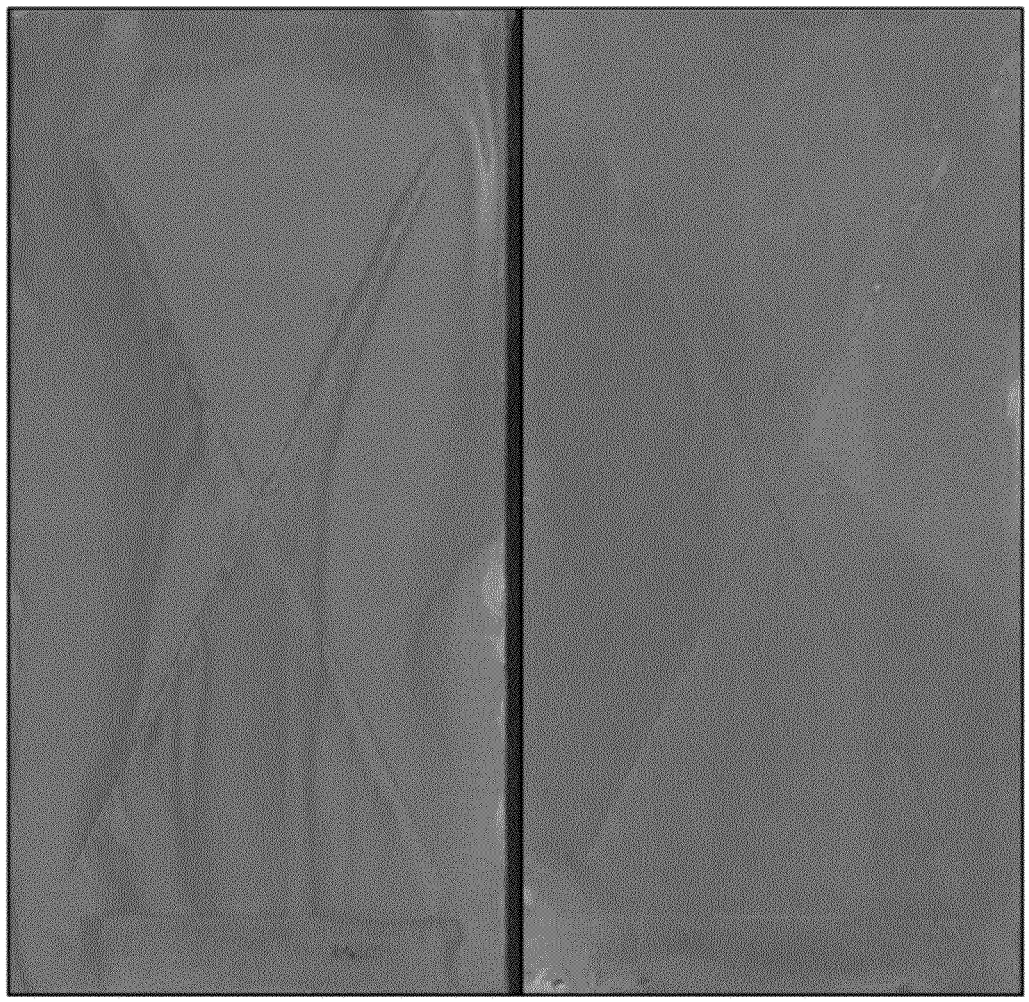
FIG. 5: DP-6 on 2024 (left) and 7075 (right) aluminum with Surtec 650 conversion coating after 2520 hours of exposure to ASTM B117 neutral salt fog.

Panels and coatings prepared in Example 3 were exposed to ASTM B 117 and ASTM G85 Annex 4 $SO_2$ salt fog tests. FIG. 4 shows the coatings after 840 hours in $SO_2$ salt fog. Coatings on both alloys in $SO_2$ salt fog show no evidence of corrosion of the substrate aluminum. Panels in ASTM 13117 show similar outstanding performance after 2520 hours, as shown in FIG. 5.

EXAMPLE 6

Aluminum-5% zinc-0.015% indium was melted into ingot. This ingot was cut into small pieces and atomized using a gas atomization process. In this process, spherical powders were made using an oxygen ($O_2$) atmosphere. Powders were sieved in three powder size ranges: <20 microns, 20 to 45 microns, and 45 to 100 microns. Powders in each size range were assessed for their electrochemical activity by blending in an organic, moisture curing urethane at approximately 85% by weight.

These coatings were applied to aluminum alloys, scribed and exposed to corrosive test environments. The aluminum-5% zinc-0.015% indium alloy pigment (Al—Zn—In) protected the aluminum substrate from corrosion in these tests, verifying its electrochemical activity. Control coatings made with 99.99% pure aluminum powder were tested alongside the alloy and did not protect the aluminum substrate. Electrochemical assessments of the open circuit potential and electrochemical impedance of the pigment confirm the corrosion tests.

Figure 6:
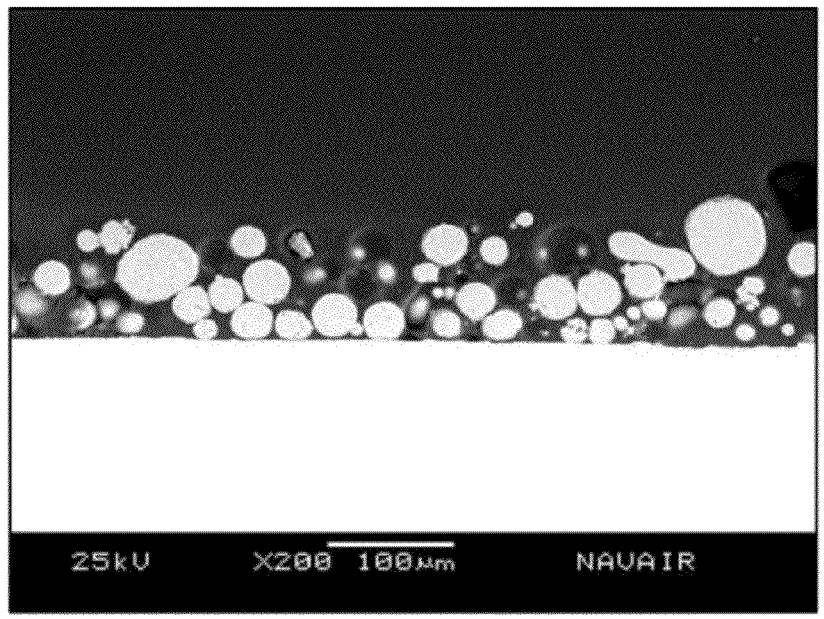
FIG. 6 shows the aluminum-5% zinc-0.015 indium pigment as a cross section of the coating.
Figure 7:
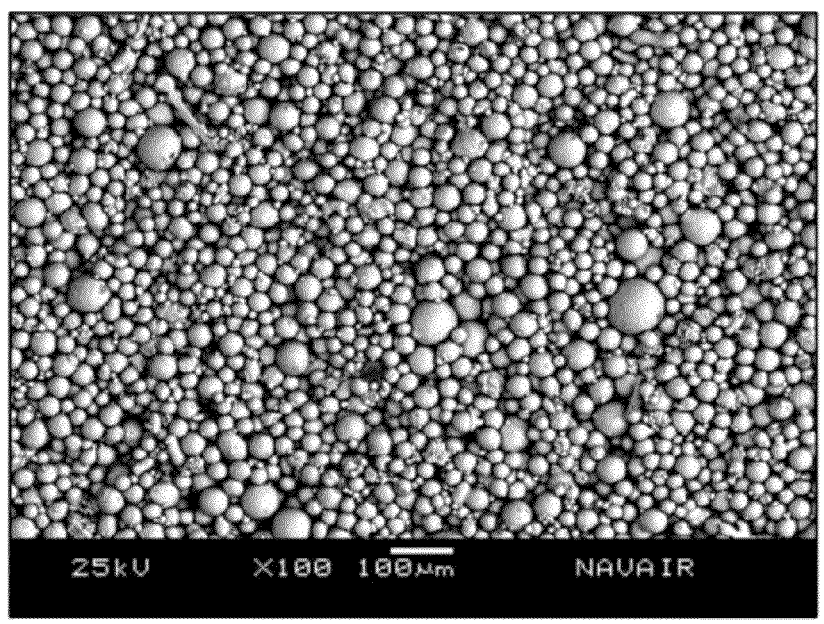
FIG. 7 shows the aluminum-5% zinc-0.015% indium pigment as the top view of the coating.

FIG. 6: shows the aluminum-5% zinc-0.015% indium pigment coating (cross section) FIG. 7: shows the aluminum-5% zinc-0.015% indium coating's top view.

Figure 8:
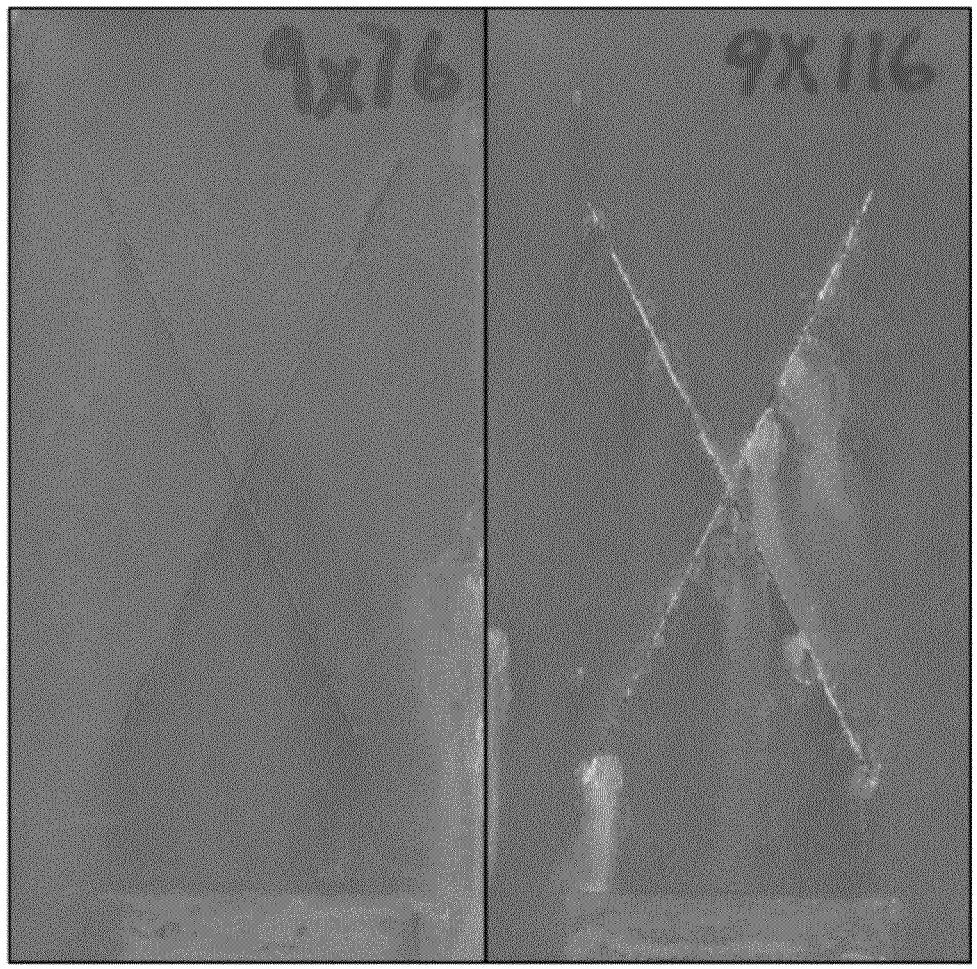
FIG. 8 shows the performance of the aluminum-5% zinc-0.015% indium (left panel) compared to 99% aluminum pigment (right panel) in urethane binder after 1000 hour exposure to ASTM B 117 salt fog.

FIG. 8 shows the performance of the aluminum-5% zinc-0.015% indium pigment (left panel) compared to 99.99% aluminum pigment (right panel) in urethane binder after 1000 hour exposure to ASTM BI 17 salt fog. It is evident that the aluminum-5% zinc-0.015% indium pigment is protecting the aluminum panel (left panel) in the scribed/damaged areas, but the 99.99% aluminum pigment did not protect the substrate.

Figure 9:
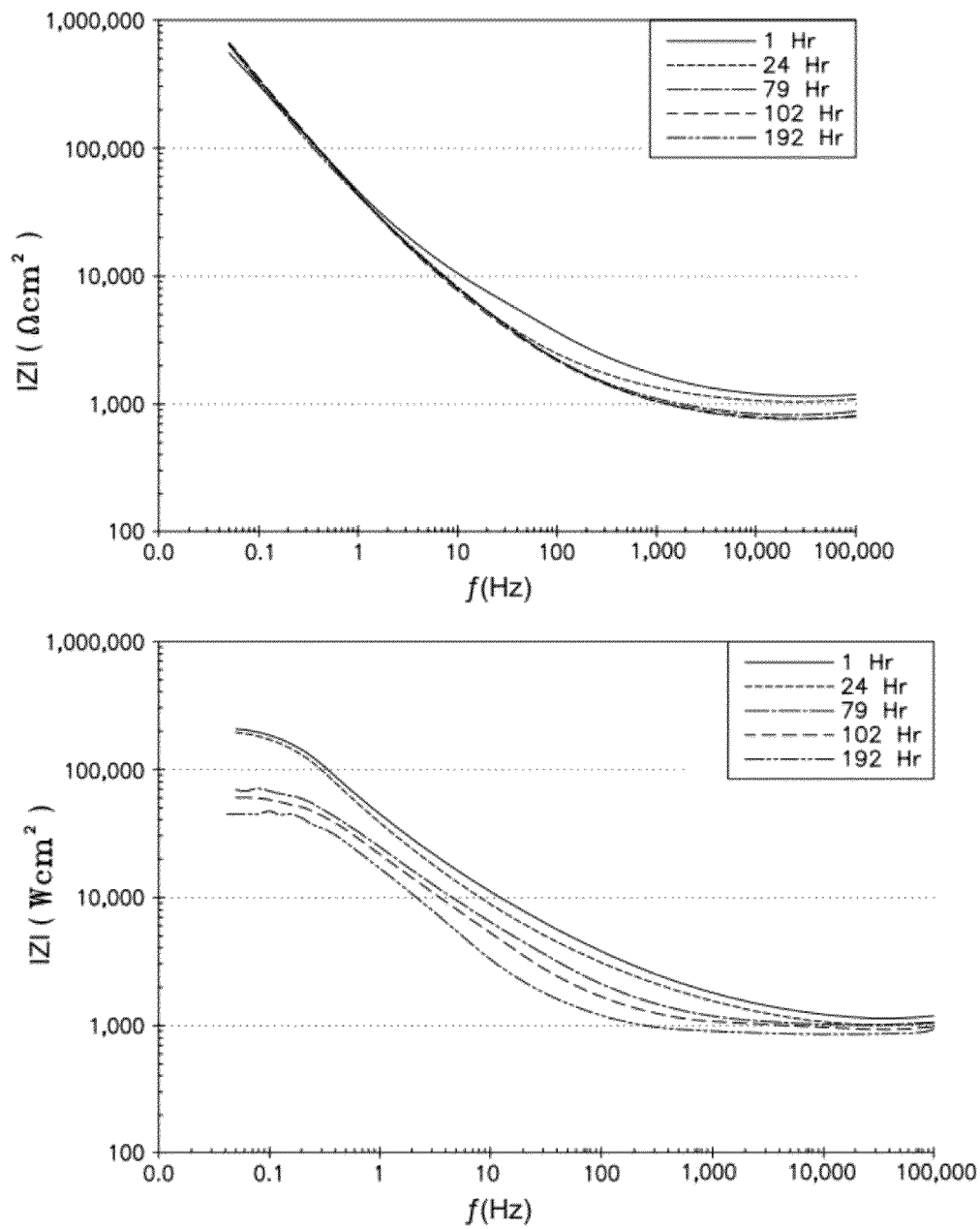
FIG. 9 shows the electrochemical characteristics of the aluminum-5% zinc-0.015% indium pigment (top graph) compared to 99.99% aluminum pigment (bottom graph).

FIG. 9 shows the electrochemical characteristics of the aluminum-5% zinc-0.015% indium pigment (top graph) compared to 99.99% aluminum pigment (bottom graph). This data was collected by exposing the pigment filled coatings shown in FIG. 8 to a salt solution and assessing the electrical response over a range of frequencies. The aluminum-5% zinc 0.015% indium pigment yields coating impedance properties which did not change over time. The 99.99% aluminum pigment coating impedance decreases about 5-fold over a wide range of frequencies. This can be explained by a breakdown in the barrier properties of the coating and Jack of electrochemical activity in the pigment. The activity of the aluminum-5% zinc-0.015% indium pigment maintains high coating impedance and corrosion inhibition.

The following examples illustrate the process for preparing specific examples of aluminum-zinc-metal alloys of this invention.

| | Chemical |
|---|---|
| DP-1 | Part A |
| | polyisocyanate |
| | diphenylmethanediisocyanate |
| | 4,4-diphenylmethane diisocyanate |
| | butyl acetate |
| | methly isoamyl ketone |
| | Part B |
| | <20 micron Al—Zn—In powder |
| | Part C |
| | moisture scavenging polymer |
| | butyl actate |
| | DP-1 Mixture |
| | Part A |
| | Part B |
| | Part C |

| Chemical | |
|---|---|
| DP-2 | Butyl acetate (thinner) |
| | Part A |
| | polyisocyanate |
| | diphenylmethanediisocyanate |
| | 4,4-diphenylmethane diisocyanate |
| | butyl acetate |
| | methly isoamyl ketone |
| | Part B |
| | <20 micron Al—Zn—In powder |
| | Part C |
| | moisture scavenging polymer |
| | butyl actate |
| | Part D |
| | Inorganic talcite clay inhibitor |
| | DP-2 Mixture |
| | Part A |
| | Part B |
| | Part C |
| | Part D |
| | Butyl acetate (thinner) |
| | Part A |
| | crystalline quartz (silica) |
| | modified polymer of epichlorohydrin |
| | methyl isobutyl ketone |
| | methyl amyl ketone |
| | titanium dioxide |
| | bis-phenol A-epichlorohydrin polymer |
| | xylene |
| | aliphatic polyepoxide |
| | acrylate |
| | ethyl benzene |
| | Part B |
| | toluene |
| | benzyl alcohol |
| | 4-tert butyl phenol |
| | silane |
| | tris-2,4,6-(dimethylaminomethyl) phenol |
| | m-xylene diamine |
| | trimethylhexamethylenediamine |
| | tetraethylenepentamine |
| | ethylenediamine |
| | Part C |
| | <20 micron Al—Zn—In powder |
| | DP-6 mixture |
| | Part A |
| | Part B |
| | Part C |

Specific examples of aluminum-zinc-metal alloy used for preparing coatings were obtained from Galvotec Alloys, Inc. which has the following chemical analysis:

| Mil - DTL - 24779A | | | | | | | | |
|---|---|---|---|---|---|---|---|---|
| (0.08–0.20) Si | <0.090 Fe | <0.0040 Cu | (4.00–6.50) Zn | <0.0020 Cd | (0.014–0.020) In | <0.0010 Sn | <0.0010 Hg | Balance Al |
| 0.11 | 0.055 | <0.0020 | 5.14 | <0.0010 | 0.018 | ND | <0.0010 | Bal |

Additional aluminum alloy powders useful for preparing the coating of this invention are shown in Table 3.

TABLE 3

CHEMICAL COMPOSITION

| Element | Conventional Weight (%) | Low Voltage Weight (%) |
|---|---|---|
| Indium | 0.014-0.020 | <0.005 |
| Gallium | N/A | 0.092-0.110 |
| Zinc | 4.0-6.5 | <0.15 |
| Silicon | 0.08-0.20 | 0.10 |
| Copper | 0.004 max | <0.005 |
| Iron | 0.090 max | <0.08 |
| Mercury | 0.001 max | <0.005 |
| Tin | 0.001 max | 0.001 max |
| Nickel | | <0.005 |
| Magnesium | | <0.010 |
| Manganese | | <0.010 |
| Aluminum | Remainder | Remaining |

The film-forming binders used in preparing the aluminum alloy coatings of this invention include the epoxies, isocyanates, acrylics, and the uncured or precursors of these polymers including the polyimides and the precursors, i.e., the polyamic acids. These imide polymers are well known and include polyimide precursors derived from aromatic dianhydrides, polyamines and reactive crosslinkable monofunctional endcaps. Preferred dianhydrides include pyromeliticdianhydride (PMDA); benzophenone tetracarboxylic dianhydride; (hexafluoroisopropylidene)-bis(phthalic anhydride) (HFDA); biphenyltetracarboxylic dianhydride (BPDA); and benzophenone tetracarboxylic dianhydride (BPDA). Various polyfunctional aromatic amines, including diamines, triamines and tetraamines and mixtures thereof can be used to prepare the polyimide precursors or polymers.

The inorganic and organic polymers used for preparing the aluminum alloy coating compositions range from about 15 to 50 parts and preferably 20 to 40 parts by weight of the coatings. Other known polymers include the epoxy resins or epoxy-resin precursors, and polymers derived from isocyanates and the isocyanate precursors. For purposes of this invention, the term "epoxy precursors" includes epoxy or epoxie compounds having one or more oxirane groups, i.e. an oxygen atom bonded to vicinal carbon atoms. Of the various precursors of epoxies particularly suitable for purposes of this invention are precursors that are liquid at room temperature. Specifically, the epoxy precursors include compounds which can be characterized either as saturated or unsaturated aliphatic, cycloaliphatic, aromatic or heterocyclic compounds. The curable epoxy precursors may be prepared in various solvents which include organic solvents which escape from the coating by evaporation during the curing step. These solvents are well known and include, for example, esters such as butyl acetate, ethyl acetate, acetates of ethylene glycol monoethyl ether (Cellosolve acetate), methyl Cellosolve acetate, and the ethers alcohols.

Other preferred binders for the aluminum-rich coatings comprise the polyurethanes derived from the isocyanates or urea and more particularly the aliphatic polyurethanes derived from the reaction of polyols and multifunctional aliphatic isocyananates. The polyol is preferably used in an organic solvent e.g., toluene, xylene, n-butyl acetate, methylethyl ketone, etc. The hydroxyl number of the polyol, and the isocyanate (NCO) content or the equivalent weights of the isocyanate and polyol are determined in order to obtain the desired polyurethane. The preferred polyols and isocyanates are reacted in approximately stoichiometric amounts so that the NCO to hydroxyl ratio ranges from about 0.85 to 1.6 equivalent of the NCO to 1.0 equivalent of the OH. Specific compounds used in preparing these binders include, for example, isocyanates such as: diphenylmethane-4,4'-diisocyanate, toluene-2,4-diisocyanate, tetramethylene diisocyanate, decamethylene diisocyanate, ethylene diisocyanate, propylene-1,2-diisocyanate, and the like. Preferred polyisocyanates include hexamethylene diiocyanate and methylene-bis-(4-cyclohexyl isocyanate) e.g., DISMODUR-N. By selecting the proper polyols and by adjusting the NCO to OH ratio, the physical properties and efficiency of the film, such as the strength of film, flexibility, chemical resistance, solvent resistance, etc. can be controlled over a wide range.

Examples of other binders include the polyacrylates, such as the polyalkylacrylates, polymethacrylates, polymethylmethacrylate, polybutylmethacrylate, polyethylmethacrylate, polypropylmethacrylate, and combinations thereof. Also included as binders are the water soluble acrylics latex emulsion coatings.

Inorganic binders can be used in the present invention and include those described in *Generic Coating Types: An Introduction to Industrial Maintenance Coating Materials*, Lloyd M. Smith (editor) Technology Publishing, Pittsburgh, Pa. This publication is hereby incorporated by reference. For example, the coatings prepared from inorganic binders which have a modified $SiO_2$ structure can be derived from silicates, silanes, siloxanes or silicones.

The coatings can be applied to the substrate in the form of a suspension or solution in a suitable solvent or combination of solvents. Application can be carried out by any technique, for example, spraying, brushing, rolling, flooding, immersion, to achieve a suitable coating thickness, ranging up to about ten (10) mils.

A variety of organic solvents are known and which can be used for purposes of this invention. The preferred solvents are substantially non-polar or oleophilic solvents. These preferred solvents include aromatic or aliphatic hydrocarbons. Aromatic solvents include benzene, toluene, xylenes, naphtha, and fractions from the distillation of petroleum. Aliphatic hydrocarbon solvents include hexane, cyclohexane, heptanes, octanes, and similar straight and branched hydrocarbons and mixtures thereof, generally having 4-16 carbon atoms. Included are the aliphatic fractions from distillation of petroleum including mineral spirits and various mixtures of these solvents in any ratio. Aqueous systems include the acrylic resins well known for use in latex coatings.

The wetting agents used to apply the coatings to the metal surface are added to the coatings in amounts ranging from about 0.0-2.0 part by weight and preferably in amounts ranging from about 0.1 to 1.5 part. These wetting agents preferably include the lower weight glycols, such as ethylene or propylene glycols, the aliphatic alcohols, alkoxyalcohols, ethers, etheralcohols, glycol ethers, and combinations thereof.

The viscosity or thickening of the coating may be adjusted for the particular method of application by adding inert organic solvents. The coated metal surface may be dried by exposure to air or by baking. If the coating composition is of correct viscosity, the coating or film can be applied directly to the metal surface and baking may not be necessary. The film thickness may not be critical, however, a coating ranging up to about 0.003 inches or more per square foot for coatings of aircraft frames or other structural members may be sufficient to provide adequate corrosion protection. The coatings are applied onto the substrates at thickness ranging from about 0.001 to 0.003 inches, e.g., up to ten mils. The coating may be applied by various methods including spraying, rolling, or brushing onto the surface depending on the viscosity. The viscosity of the coating for the particular application may be achieved by adjusting the content of the solvent within the ranges specified and by the selection of the particular reactants used to form the polymeric binder.

While this invention has been described by a number of specific examples, it is obvious to one skilled in the art that there are other variations and modifications which can be made without departing from the spirit and scope of the invention as particularly set forth in the appended claims.

What is claimed is:

1. A chromate-free corrosion-inhibiting coating composition for application onto metal substrates consisting essentially of, in parts by weight, from about
    15 to 50 parts of a film-forming binder selected from the group consisting of polyacrylates, polyurethanes, polyimides, polymers derived from epoxies, polymers derived from isocyanates, and an uncured pre-polymers of said polymers,
    40 to 85 parts of a galvanic aluminum alloy powder prepared in an oxygen or nitrogen-hydrogen atmosphere having a particle size ranging from about 10 to 100 microns; said aluminum alloy powder having the formula: Aluminum-Zinc-X (AlZnX), wherein X is an element selected from the group consisting of indium, gallium, tin, and bismuth, from about
    0.0 to 2.0 parts of at least one wetting agent, from about
    1.0 to 10 parts of at least one corrosion inhibitor selected from the group consisting of an inorganic talcite clay, benzimidazole, benzothiazole, benzoxazole, diphenyltriazole, benzotriazole and tolyltriazole, and effective amounts of solvent.

2. The coating composition of claim 1, wherein the aluminum alloy powder consist essentially of indium present in an amount of about 0.014-0.02% by weight, zinc present in an amount of about 4.0-6.5% by weight, and the balance percentage being aluminum.

3. The coating composition of claim 1, wherein the binder is a film-forming binder derived from the uncured pre-polymers of said polymers.

4. The coating composition of claim 1, wherein the corrosion inhibitor is talcite clay.

5. The coating composition of claim 1, wherein the corrosion inhibitor is a triazole.

6. The coating composition of claim 1, wherein the effective amount of solvent ranges from 10 to about 25 percent by weight of an uncured coating.

7. The coating composition of claim 1, wherein the aluminum alloy powder consist essentially of the formula: AlZnX, wherein X is indium present in the amount of about 0.018% by weight, zinc present in an amount of about 5.14% by weight and the balance of the alloy powder being aluminum.

8. A chromate-free corrosion-inhibiting coating composition for application onto metal substrates consisting essentially of, in parts by weight, from about
    20 to 40 parts of a film-forming binder, selected from the group consisting of polyacrylates, polyurethanes, polyimides, polymers derived from epoxies, polymers derived from isocyanates, and an uncured pre-polymers of said polymers,
    50 to 70 parts of galvanic aluminum alloy powder prepared in an oxygen or nitrogen-hydrogen atmosphere having particle sizes ranging from about 20 to 100 microns; said aluminum alloy powder consisting essentially of the formula: Aluminum-Zinc-X (AlZnX), wherein X is an element selected from the group consisting of indium, gallium, tin, and bismuth, from about 0.0 to 2.0 parts of at least one wetting agent, from about 2.0 to 6.0 parts of at least one corrosion inhibitor selected from the group consisting of inorganic talcite clay, benzimidazole, benzothiazole, benzoxazole, diphenyltriazole, benzotriazole and tolyltriazole, and effective amounts of an organic solvent.

9. The coating composition of claim 8, wherein the binder is a polyacrylate.

10. The coating composition of claim 9, wherein the corrosion inhibitor is talcite clay.

11. The coating composition of claim 9, wherein the corrosion inhibitor is a triazole.

12. The coating composition of claim 9, wherein an effective amount of the solvent ranges up to about 25% by weight of an uncured coating.

13. The coating composition of claim 8, wherein the film-forming binder is polymer derived from an isocyanate.

14. The coating composition of claim 8, wherein the film-forming binder is polymers derived from an uncured epoxy pre-polymer.

15. Process for inhibiting the corrosion of a metal substrate which comprises coating said metal substrate with an effective amount of a chromate-free corrosion-inhibiting coating composition consisting essentially of, in parts by weight, from about, 15 to 50 parts of a film-forming binder selected from the group consisting of polyacrylates, polyurethanes, polyimides, polymers derived from epoxies, polymers derived from isocyanates, and an uncured pre-polymers of said polymers, 40 to 85 parts of a galvanic aluminum alloy powder having a particle size ranging from about 10 to 100 microns; said aluminum alloy powder prepared in an atmosphere of oxygen or nitrogen-hydrogen and having the formula: Aluminum-Zinc-X (AlZnX), wherein X is an element selected from the group consisting of indium, gallium, tin and bismuth, from about 0.0 to 2.0 parts of at least one wetting agent, from about 1.0 to 10 parts of at least one corrosion inhibitor selected from the group consisting of an inorganic talcite clay, benzimidazole, benzothiazole, benzoxazole, diphenyltriazole, benzotriazole, and tolyltriazole, effective amounts of solvent and subsequently curing said coating composition.

16. A process for inhibiting the corrosion of a metal substrate which comprises coating said metal substrate with an effective amount of a chromate-free corrosion-inhibiting coating composition consisting essentially of, in parts by weight, from about 20 to 40 parts of a film-forming binder selected from the group consisting of polyacrylates, polyurethanes, polyimides, polymers derived from epoxies, polymers derived from isocyanates, and an uncured pre-polymers of said polymers, 50 to 70 parts of a galvanic aluminum-alloy powder prepared in an atmosphere of oxygen and having a particle size ranging from about 20 to 45 microns; said aluminum alloy powder having the formula: Aluminum-Zinc-X (AlZnX), wherein X is an element selected from the group consisting of indium, gallium, tin, and bismuth, from about 0.1-1.5 parts of at least one wetting agent, from about 2.0 to 6.0 parts of a least one corrosion inhibitor selected from the group consisting of an inorganic talcite clay, benzimidazole, benzothiazole, benzoxazole, diphenyltriazole, benzotriazole and tolyltriazole, effective amounts of solvent and subsequently curing said composition to form the coating.

17. The process of claim 16, wherein X is indium present in an amount ranging from about 0.014 to 0.02% by weight, zinc ranging from about 4.0 to 6.5% by weight, and the balance of the alloy powder is aluminum.

18. The process of claim 16, wherein the film-forming binder is an uncured pre-polymer of said polymer.

19. The process of claim 16, wherein the film-forming binder is derived from an isocyanate.

20. The process of claim 16, wherein the corrosion inhibitor is talcite clay.

21. The process of claim 16, wherein the corrosion inhibitor is a triazole.

22. The process of claim 16, wherein an effective amount of solvent ranges from about 25 to 50% by weight of an uncured coating.

23. The process of claim 22, wherein X is indium present in the amount of about 0.014% by weight, zinc is present in the amount of about 4.0-6.5% by weight and the balance of the alloy powder is aluminum.

24. The process of claim 23, wherein the corrosion inhibitor is a combination of talcite clay and a triazole.

* * * * *